(12) United States Patent
Tzomik et al.

(10) Patent No.: US 10,562,268 B2
(45) Date of Patent: Feb. 18, 2020

(54) LAMINATES

(71) Applicant: HP Indigo B.V., Amstelveen (NL)

(72) Inventors: Inna Tzomik, Modiin (IL); Raia Slivniak, Lod (IL); Sergio Brandriss, Rehovot (IL); Alexander Stolov, Nes Ziona (IL); Faina Kogan, Nes Ziona (IL); Daniel Skvirsky, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/751,823

(22) PCT Filed: Oct. 23, 2015

(86) PCT No.: PCT/EP2015/074599
§ 371 (c)(1),
(2) Date: Feb. 9, 2018

(87) PCT Pub. No.: WO2017/067605
PCT Pub. Date: Apr. 27, 2017

(65) Prior Publication Data
US 2018/0229475 A1   Aug. 16, 2018

(51) Int. Cl.
B32B 7/14        (2006.01)
B32B 23/08       (2006.01)
(Continued)

(52) U.S. Cl.
CPC ............... *B32B 7/14* (2013.01); *A61J 1/035* (2013.01); *B32B 1/00* (2013.01); *B32B 3/00* (2013.01); *B32B 3/02* (2013.01); *B32B 3/26* (2013.01); *B32B 3/28* (2013.01); *B32B 3/30* (2013.01); *B32B 7/00* (2013.01); *B32B 7/04* (2013.01); *B32B 7/12* (2013.01); *B32B 15/00* (2013.01); *B32B 15/04* (2013.01); *B32B 15/08* (2013.01);
(Continued)

(58) Field of Classification Search
CPC ... A61J 1/035; B32B 7/14; B32B 1/00; B32B 3/00; B32B 7/00
USPC ......................................................... 428/203
See application file for complete search history.

(56) References Cited

U.S. PATENT DOCUMENTS

| 4,387,129 A | 6/1983 | Vincent |
| 4,762,764 A | 8/1988 | Ng et al. |

(Continued)

FOREIGN PATENT DOCUMENTS

| CN | 15553318 | 12/2004 |
| CN | 103476882 | 12/2013 |

(Continued)

OTHER PUBLICATIONS

International Search Report and Written Opinion for International Application No. PCT/EP2015/074599 dated Jul. 5, 2016, 12 pages.

*Primary Examiner* — Betelhem Shewareged
(74) *Attorney, Agent, or Firm* — Dierker & Kavanaugh PC

(57) ABSTRACT

There is provided a laminate, comprising a base material, a transparent electrostatic ink composition selectively disposed on portions of the base material, the transparent electrostatic ink composition comprising a thermoplastic resin, and a charge adjuvant and/or a charge director; a substrate adhered to the base material at the portions of the base material by the transparent electrostatic ink composition. A process for preparing a laminate and a blister pack are also disclosed.

14 Claims, 3 Drawing Sheets

(51) Int. Cl.

| | | |
|---|---|---|
| *B32B 27/08* | (2006.01) | |
| *B32B 15/04* | (2006.01) | |
| *B32B 27/30* | (2006.01) | |
| *B32B 15/08* | (2006.01) | |
| *B32B 3/28* | (2006.01) | |
| *B32B 7/00* | (2019.01) | |
| *B32B 25/00* | (2006.01) | |
| *B32B 25/04* | (2006.01) | |
| *B32B 7/04* | (2019.01) | |
| *B32B 27/28* | (2006.01) | |
| *B32B 3/26* | (2006.01) | |
| *B32B 3/00* | (2006.01) | |
| *B32B 3/02* | (2006.01) | |
| *B32B 27/06* | (2006.01) | |
| *B32B 7/12* | (2006.01) | |
| *B32B 27/00* | (2006.01) | |
| *B32B 23/04* | (2006.01) | |
| *B32B 27/32* | (2006.01) | |
| *B32B 15/00* | (2006.01) | |
| *B32B 27/40* | (2006.01) | |
| *B32B 1/00* | (2006.01) | |
| *B32B 3/30* | (2006.01) | |
| *B32B 23/00* | (2006.01) | |
| *B32B 25/14* | (2006.01) | |
| *B32B 27/36* | (2006.01) | |
| *B32B 25/16* | (2006.01) | |
| *B32B 27/18* | (2006.01) | |
| *A61J 1/03* | (2006.01) | |
| *B32B 37/12* | (2006.01) | |
| *B32B 37/18* | (2006.01) | |
| *B32B 38/00* | (2006.01) | |

(52) U.S. Cl.
CPC ............. *B32B 23/00* (2013.01); *B32B 23/04* (2013.01); *B32B 23/08* (2013.01); *B32B 25/00* (2013.01); *B32B 25/04* (2013.01); *B32B 25/14* (2013.01); *B32B 25/16* (2013.01); *B32B 27/00* (2013.01); *B32B 27/06* (2013.01); *B32B 27/08* (2013.01); *B32B 27/18* (2013.01); *B32B 27/28* (2013.01); *B32B 27/30* (2013.01); *B32B 27/302* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *B32B 37/1292* (2013.01); *B32B 37/182* (2013.01); *B32B 38/145* (2013.01); *B32B 2250/00* (2013.01); *B32B 2255/10* (2013.01); *B32B 2255/205* (2013.01); *B32B 2255/26* (2013.01); *B32B 2274/00* (2013.01); *B32B 2307/20* (2013.01); *B32B 2307/40* (2013.01); *B32B 2307/412* (2013.01); *B32B 2307/75* (2013.01); *B32B 2439/00* (2013.01); *B32B 2439/70* (2013.01); *B32B 2439/80* (2013.01); *B32B 2457/00* (2013.01); *B32B 2553/00* (2013.01)

(56) References Cited

U.S. PATENT DOCUMENTS

| | | |
|---|---|---|
| 4,968,063 A | 11/1990 | McConville et al. |
| 5,546,114 A | 8/1996 | Tait et al. |
| 6,221,545 B1 | 4/2001 | Tran et al. |
| 6,468,637 B1 | 10/2002 | Kwasny et al. |
| 6,509,128 B1 | 1/2003 | Everaerts et al. |
| 7,854,987 B2 | 12/2010 | Jaipuria |
| 2002/0047889 A1 | 4/2002 | Springett et al. |
| 2003/0118801 A1* | 6/2003 | Miller .................... B32B 27/08 428/220 |
| 2003/0230209 A1 | 12/2003 | Gonzalez et al. |
| 2005/0054780 A1 | 3/2005 | Zhou et al. |
| 2008/0241723 A1 | 10/2008 | Kmiecik-Lawrynowicz |
| 2008/0248261 A1 | 10/2008 | Bonnett et al. |
| 2011/0123228 A1* | 5/2011 | Roditi .................. C09D 11/037 399/237 |
| 2013/0004742 A1 | 1/2013 | La Costa |
| 2013/0202860 A1 | 8/2013 | Wei et al. |
| 2014/0093706 A1 | 4/2014 | Tzornik et al. |
| 2014/0370252 A1 | 12/2014 | Regnier |
| 2015/0220010 A1 | 8/2015 | Grinwald et al. |
| 2015/0227064 A1* | 8/2015 | Bandriss ................ G03G 7/002 156/277 |
| 2017/0329270 A1 | 11/2017 | Ron et al. |
| 2018/0229475 A1* | 8/2018 | Tzomik .................... B32B 7/14 |

FOREIGN PATENT DOCUMENTS

| | | |
|---|---|---|
| CN | 104853915 | 8/2015 |
| CN | 107209464 | 9/2017 |
| GB | 1291841 | 10/1972 |
| JP | 02155692 | 6/1990 |
| JP | H11034215 | 9/1999 |
| JP | 200553109 | 3/2005 |
| JP | 2008175888 | 7/2008 |
| JP | 2014133954 | 7/2014 |
| JP | 2014153646 | 8/2014 |
| JP | 2015529835 | 10/2015 |
| WO | WO 01/79318 | 10/2001 |
| WO | WO 2014/067578 | 5/2014 |
| WO | WO 2014/206494 | 12/2014 |
| WO | WO2014206492 | 12/2014 |
| WO | WO 2015/110173 | 7/2015 |

\* cited by examiner

LAMINATES

BACKGROUND

Laminates are layered materials. They may be used in a large variety of applications, including, but not limited to, the packaging and labelling fields. In some instances, laminates are formed from polymeric films which are adhered together. Other laminates include a variety of materials, which may or may not include plastic. Laminates sometimes display decorative images or information.

A blister pack is a term for several types of pre-formed plastic packaging used for small consumer goods, foods, and for pharmaceuticals.

A blister pack is typically composed of two parts, one of which is typically flat and the other of which has a raised portion, creating a cavity in which an object can reside between the two parts.

DETAILED DESCRIPTION

Figure 1A:
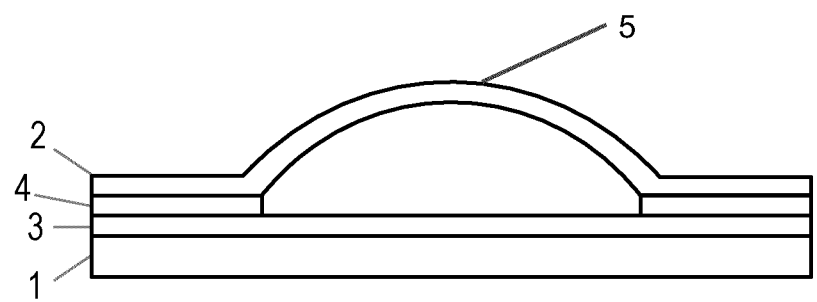
FIGS. 1A, 1B and 1C show schematically an example of a laminate, in the form of a blister pack and its formation.

Before the laminates and related aspects are disclosed and described, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and other additives can be dispersed to form a liquid electrostatic ink or electrophotographic ink. Such carrier liquids and vehicle components are known in the art. Typical carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. The electrostatic ink composition, when printing, may include chargeable particles of the resin and, if present, the pigment dispersed in a liquid carrier, which may be as described herein. A transparent electrostatic ink composition may be an electrostatic ink composition that lacks a colorant (e.g. a pigment). An electrostatic ink composition for forming an image layer, in contrast, may contain a colorant (e.g. a pigment). A colorant may be a species that imparts a colour to the ink, e.g. a colour selected from a magenta, cyan, yellow and black.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, in the context of the base material and substrate, the term "transparent" may mean having the property of transmitting rays of light through its substance so that an image printed beyond or behind can be seen distinctly through the substance. In the context of the electrostatic ink composition, the term "transparent" may mean having no or substantially no colorant or pigment.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided a laminate. The laminate may comprise:
a base material;
a transparent electrostatic ink composition selectively disposed on a portion of the base material, the transparent electrostatic ink composition comprising a thermoplastic resin, and a charge adjuvant and/or a charge director;
a substrate adhered to the base material at the portion of the base material by the transparent electrostatic ink composition.

In an aspect, there is provided a process for preparing a laminate. The process may comprise:
printing a transparent electrostatic ink composition selectively onto a predetermined portion of a base material, wherein the printed electrostatic ink composition comprises a thermoplastic resin, and a charge adjuvant and/or a charge director;
providing a substrate; and
contacting the substrate with the transparent electrostatic ink composition on the base material, so that the electrostatic ink composition selectively adheres the base material and the flexible substrate together at the predetermined portion of the base material.

In an aspect, there is provided a blister pack, comprising:
a base material;
a substrate adhered to a portion of the base material by an electrostatic ink composition comprising a thermoplastic resin, and a charge adjuvant and/or a charge director, the substrate having a raised portion for accepting or containing an object between the substrate and the base material. The electrostatic ink composition comprising a thermoplastic resin, and a charge adjuvant and/or a charge director may be a transparent electrostatic ink composition.

In an aspect, there is provided a laminate, e.g. a blister pack, producible according to the process described herein.

Laminate

In some examples, the laminate comprises a laminate structure with sufficient bond strength to avoid delamination of the layers. In some examples, the lamination bond strength is measured directly after the laminate has cooled to room temperature following lamination. In some examples, the lamination bond strength is measured on a laminate that has not been subjected to any curing or rest period following lamination and cooling. In some examples, the lamination bond strength is measured immediately after lamination and cooling of the laminate.

In some examples, the laminate has a lamination bond strength as measured by ASTM F0904-98R08. In some examples, the laminate has a lamination bond strength of at least about 0.5 N/inch, for example at least about 1.0 N/inch, for example at least about 1.2 N/inch, for example at least about 1.5 N/inch, for example at least about 2.0 N/inch, for example at least about 2.5 N/inch, for example at least about 3.0 N/inch, for example at least about 4.0 N/inch, for example at least about 5.0 N/inch, for example at least about 6.0 N/inch, for example at least about 7.0 N/inch, for example at least about 8.0 N/inch, for example at least about 9.0 N/inch, for example about 10.0 N/inch, as measured by ASTM F0904-98R08.

In some examples, the laminate has a lamination bond strength of less than about 10 N/inch, for example less than about 9.0 N/inch, for example less than about 8 N/inch, for example less than about 7.0 N/inch, for example less than about 6.0 N/inch, for example less than about 5.0 N/inch, for example less than about 4.0 N/inch, for example less than about 3.0 N/inch, for example less than about 2.5 N/inch, for example less than about 2.0 N/inch, for example less than about 1.5 N/inch, for example less than about 1.2 N/inch, for example less than about 1.0 N/inch, for example about 0.5 N/inch, as measured by ASTM F0904-98R08.

Transparent Electrostatic Ink Composition

The transparent electrostatic ink composition comprises a thermoplastic resin, and a charge adjuvant and/or a charge director. The transparent electrostatic ink composition does not contain any pigment, or comprises substantially lacks pigment and thus is a pigment-free composition. The transparent electrostatic ink composition may otherwise be termed a colourless electrostatic ink composition or a colorless varnish for digital printing. The transparent electrostatic ink may comprise less than 5 wt % solids of colorant, in some examples less than 3 wt % solids of colorant, in some examples less than 1 wt % solids of colorant. "Colorant" may be a material that imparts a color to the ink composition. As used herein, "colorant" includes pigments and dyes, such as those that impart colors such as black, magenta, cyan and yellow to an ink. As used herein, "pigment" generally includes pigment colorants, magnetic particles, aluminas, silicas, and/or other ceramics or organometallics. Thus, though the present description primarily exemplifies the use of pigment colorants, the term "pigment" can be used more generally to describe not only pigment colorants, but other pigments such as organometallics, ferrites, ceramics, etc.

The thermoplastic resin may constitute at least 85 wt % solids of the solids of the transparent electrostatic ink composition, in some examples at least 90 wt % solids of the solids of the transparent electrostatic ink composition, in some examples 95, wt % of the solids of the transparent electrostatic ink composition.

If a solid polar compound and/or additional polymer is present, the thermoplastic resin and the solid polar compound/additional polymer together may constitute at least 85 wt % solids of the solids of the transparent electrostatic ink composition, in some examples at least 90 wt % solids of the solids of the transparent electrostatic ink composition, in some examples 95, wt % of the solids of the transparent electrostatic ink composition. The remaining wt % may be a charge adjuvant and/or charge director as described herein.

The transparent electrostatic ink composition may further comprise at least one additive, e.g. an additive selected from surfactants, viscosity modifiers, emulsifiers and the like.

In some examples, once printed, the transparent electrostatic ink composition forms a layer of less than 10 µm in thickness, for example less than 9 µm in thickness, less than 8 µm in thickness, less than 7 µm in thickness, less than 6 µm in thickness, less than 5 µm in thickness, less than 4 µm in thickness, less than 3 µm in thickness, less than 2 µm in thickness, less than 1.5 µm in thickness. In some examples, the transparent electrostatic ink composition is about 1 µm in thickness.

In some examples, once printed, the transparent electrostatic ink composition forms a layer greater than 0.1 µm in thickness, for example greater than 0.2 µm in thickness, greater than 0.3 µm in thickness, greater than 0.4 µm in thickness, greater than 0.5 µm in thickness, greater than 0.6 µm in thickness, greater than 0.7 µm in thickness, greater than 0.8 µm in thickness, greater than 0.9 µm in thickness. In some examples, the film of material is about 1 µm in thickness.

Liquid Carrier

In some examples, the transparent electrostatic ink composition, when printing, comprises a liquid carrier. Generally, the liquid carrier can act as a dispersing medium for the other components in the electrostatic ink composition. For example, the liquid carrier can comprise or be a hydrocarbon, silicone oil, vegetable oil, etc. The liquid carrier can include, but is not limited to, an insulating, non-polar, non-aqueous liquid that can be used as a medium for toner particles. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before electrostatic printing, the liquid carrier can constitute about 20% to 99.5% by weight of the transparent electrostatic ink composition, in some examples 50% to 99.5% by weight of the transparent electrostatic ink composition. Before printing, the liquid carrier may constitute about 40 to 90% by weight of the transparent electrostatic ink composition. Before printing, the liquid carrier may constitute about 60% to 80% by weight of the transparent electrostatic ink composition. Before printing, the liquid carrier may constitute about 90% to 99.5% by weight of the transparent electrostatic ink composition, in some examples 95% to 99% by weight of the transparent electrostatic ink composition.

The ink, when electrostatically printed on the base material, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the base material contains less than 5 wt % liquid carrier, in some examples, less than 2 wt % liquid carrier, in some examples less than 1 wt % liquid carrier, in some examples less than 0.5 wt % liquid carrier. In some examples, the ink printed on the base material is free from liquid carrier.

Thermoplastic Resin

The transparent electrostatic ink composition includes a thermoplastic resin, referred to as the resin. A thermoplastic polymer is sometimes referred to as a thermoplastic resin.

The resin typically includes a polymer. The resin can include, but is not limited to, a thermoplastic polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with at least one counterion, typically a metal counterion, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the thermoplastic resin constitutes about 10 to 99%, in some examples about 15 to 95%, by weight of the solids of the transparent electrostatic ink composition. In another example, the resin constitutes about 20 to 95% by weight of the solids of the transparent electrostatic ink composition. In another example, the resin constitutes about 25 to 95% by weight of the solids of the transparent electrostatic ink composition. In another example, the resin constitutes about 35 to 95% by weight, in some examples from 75 to 95% by weight, of the solids of the transparent electrostatic ink composition. In another example, the resin constitutes about 35 to 95% by weight, in some examples from 75 to 99% by weight, of the solids of the transparent electrostatic ink composition.

The thermoplastic resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

Charge Director and Charge Adjuvant

The transparent electrostatic ink composition may includes either a charge director or a charge adjuvant or both. The charge director may comprise ionic compounds, particularly metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of an electrostatic ink composition.

The charge director may be added in order to impart and/or maintain sufficient electrostatic charge on the ink particles, which may be particles comprising the thermoplastic resin.

In some examples, the transparent electrostatic ink composition comprises a charge director comprising a simple salt. Simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), Cl⁻, $BF_4^-$, F⁻, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof.

The charge director may include at least one of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the transparent electrostatic ink composition comprises a charge director comprising a sulfosuccinate salt of the general formula MAn, wherein M is a metal, n is the valence of M, and A is an ion of the general formula (I):

$$[R^1—O—C(O)CH_2CH(SO_3)C(O)—O—R^2]—$$ (I)

wherein each of $R^1$ and $R^2$ is an alkyl group.

The sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more.

In the formula $[R_1—O—C(O)CH_2CH(SO_3—)C(O)—O—R_2]$, in some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$. In some examples, M is Na, K, Cs, Ca, or Ba.

In some examples, the charge director constitutes about 0.001% to 20%, in some examples 0.01% to 20% by weight, in some examples 0.01 to 10% by weight, in some examples 0.01% to 1% by weight of the solids of an transparent electrostatic ink composition. In some examples, the charge director constitutes about 0.001% to 0.15% by weight of the solids of the transparent electrostatic ink composition, in some examples 0.001% to 0.15%, in some examples 0.001% to 0.02% by weight of the solids of an transparent electrostatic ink composition, in some examples 0.1% to 2% by weight of the solids of the transparent electrostatic ink composition, in some examples 0.2% to 1.5% by weight of the solids of the transparent electrostatic ink composition in some examples 0.1% to 1% by weight of the solids of the transparent electrostatic ink composition, in some examples 0.2% to 0.8% by weight of the solids of the transparent electrostatic ink composition. In some examples, the charge director is present in an amount of at least 1 mg of charge director per gram of solids of the transparent electrostatic ink composition (which will be abbreviated to mg/g), in some examples at least 2 mg/g, in some examples at least 3 mg/g, in some examples at least 4 mg/g, in some examples at least 5 mg/g. In some examples, the charge director is present in the amounts stated above, and the charge director is present in an amount of from 1 mg to 50 mg of charge director per gram of solids of the transparent electrostatic ink composition (which will be abbreviated to mg/g), in some examples from 1 mg/g to 25 mg/g, in some examples from 1 mg/g to 20 mg/g, in some examples from 1 mg/g to 15 mg/g, in some examples from 1 mg/g to 10 mg/g, in some examples from 3 mg/g to 20 mg/g, in some examples from 3 mg/g to 15 mg/g, in some examples from 5 mg/g to 10 mg/g.

A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the transparent electrostatic ink composition, in some examples about 1 wt % to 3 wt % of the solids of the transparent electrostatic ink composition, in some examples about 1.5 wt % to 2.5 wt % of the solids of the transparent electrostatic ink composition.

In some examples, the transparent electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the transparent electrostatic ink composition, in some examples in an amount of 0.1 wt % to 2 wt % of the solids of the transparent electrostatic ink composition, in some examples in an amount of 0.1 wt % to 2 wt % of the solids of the transparent electrostatic ink composition, in some examples in an amount of 0.3 wt % to 1.5 wt % of the solids of the transparent electrostatic ink composition, in some examples about 0.5 wt % to 1.2 wt % of the solids of the transparent electrostatic ink composition, in some examples about 0.8 wt % to 1 wt % of the solids of the transparent electrostatic ink composition, in some examples about 1 wt % to 3 wt % of the solids of the transparent electrostatic ink composition, in some examples about 1.5 wt % to 2.5 wt % of the solids of the transparent electrostatic ink composition.

Other Additives

The transparent electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Additional Polymers

The electrostatic ink composition may contain an additional polymers, which may be a hot melt adhesive. The introduction of these polymers into the electrostatic ink composition enhances adhesion properties.

The adhesion-enhancing polymers or non-polymers may be first swollen in a carrier liquid, together with the resin. Other polymers which do not swell in the carrier liquid may be pre-ground into a fine powder prior to their introduction into the resin. Additional polymers introduced into the electrostatic ink composition may be for example selected from: vinyl acetate copolymers (sometimes termed ethylene vinyl acetate co-polymers), polyolefins such as polyethylene (which may be selected from low density polyethylene and high density polyethylene), polybutene-1, styrene block co-polymers (including styrene-butadiene-styrene, styrene-isoprene-styrene, styrene-ethylene and/or butylenes-styrene, styrene-ethylene and/or propylene, polycaprolactone, polycarbonates, fluoropolymers, silicone rubbers, polypyrrole, co-polymers of ethylene acrylic/methacrylic ethylene maleic anhydride copolymers or ter-polymers of ethylene maleic anhydride acrylic acid, ethylene acrylates/methacrylates co polymers and ter-polymers, blocked co-polymers, like polyethylene co-ethylene glycol copolymer, or blocked tri-polymers, ionomers, polyamides and copolymers thereof, amine-containing polymers, polyesters and derivatives thereof, polyurethanes, epoxy and mixtures thereof.

In some examples, the electrostatic ink composition may comprise a resin selected from ethylene acrylic acid copolymers and ethylene methacrylic acid copolymers and an additional polymer selected from vinyl acetate co-polymers (sometimes termed ethylene vinyl acetate co-polymers), polyolefins such as polyethylene (which may be selected from low density polyethylene and high density polyethylene), polybutene-1, styrene block co-polymers (including styrene-butadiene-styrene, styrene-isoprene-styrene, styrene-ethylene and/or butylene-styrene, styrene-ethylene and/or propylene), polycaprolactone, polycarbonates, fluoropolymers, silicone rubbers, polypyrrole, ethylene maleic anhydride co-polymers, ter-polymers of ethylene maleic anhydride acrylic, ethylene acrylates/methacrylates co-polymers and ter-polymers, blocked co-polymers, such polyethylene co-ethylene glycol copolymer, or blocked tri-polymers, ionomers, polyamides and copolymers thereof, amine-containing polymers, polyesters and derivatives thereof, polyurethanes, epoxy and mixtures thereof.

Solid Polar Compound

The transparent electrostatic ink composition may further comprise a solid polar compound. In some examples, the solid polar compound is a solid (e.g., at room temperature, i.e., from about 20° C. to about 25° C.), colorless organic material. The solid organic material may be a polymeric material or a non-polymeric material. The solid polar compound may be an organic particle that is resistant to swelling or dissolving in a non-polar carrier fluid, e.g. an isoparaffinic fluid as described herein. The solid polar compound may be dispersed in the resin, and, in some examples, is present in an amount up to 60 wt. % of solids in the transparent electrostatic ink composition. The solid polar compound may be selected from the group consisting of a saccharide, polyacrylic acid, polyvinyl alcohol, styrene maleic anhydride, a bismaleimide oligomer, a cellulose derivative and an aliphatic urethane acrylate.

In some examples, the transparent electrostatic ink composition comprises a saccharide or a modified saccharide. In some examples, modified saccharides are acetylated saccharides. In some examples, the transparent electrostatic ink composition comprises a disaccharide or a modified disaccharide. In some examples, the transparent electrostatic ink composition comprises a saccharide or modified saccharide selected from maltose monohydrate, sucrose, sucrose octanoate, sucrose octaacetate, dextrin, xylitol and sucrose benzoate.

In some examples, the transparent electrostatic ink composition comprises a saccharide or a modified saccharide in an amount of greater than 15 wt % of the non-volatile solids in the electrostatic ink composition, for example, in an amount of greater than 20 wt % of the non-volatile solids in the transparent electrostatic ink composition, for example in an amount of greater than 25 wt % of the non-volatile solids in the transparent electrostatic ink composition, for example in an amount of greater than 30 wt % of the non-volatile solids in the transparent electrostatic ink composition. In some examples, the transparent electrostatic ink composition comprises a saccharide or a modified saccharide in an amount of less than 60 wt % of the non-volatile solids in the transparent electrostatic ink composition, for example less than 50 wt % of the non-volatile solids in the electrostatic ink composition, for example less than 45 wt % of the non-volatile solids in the transparent electrostatic ink composition, for example less than 40 wt % of the non-volatile solids in the transparent electrostatic ink composition.

In some examples, the saccharide is selected from the group consisting of maltose monohydrate, sucrose, sucrose octanoate, dextrin, xylitol, sucrose octaacetate, and sucrose benzoate. In some examples, the solid polar compound has a particle size from about 30 nm to about 300 nm.

Examples of commercially available styrene maleic anhydrides include copolymers from Sartomer Co. USA, LLC, such as SMA® 40001, SMA® 10001, and SMA® 1000P. Examples of cellulose derivatives include sodium carboxylmethyl cellulose and cellulose acetate propionate. A suitable example of a bismaleimide oligomer is bis-stearamide, and a suitable example of an aliphatic urethane acrylate is REAFREE® UV ND-2335 from Arkema, Spain. It is to be understood that these solid polar compounds are examples, and that any other organic material that includes polar atoms and is resistant to swelling or dissolving in a non-polar carrier fluid may be used.

Base Material and Substrate

In the laminate, the transparent electrostatic ink composition may be selectively disposed on a portion of the base material and the substrate is adhered to the base material at the portion of the base material by the transparent electrostatic ink composition. In the laminate, the transparent electrostatic ink composition may be selectively disposed on a portion of a surface of the base material and the substrate is adhered to the base material at the portion of the base material by the transparent electrostatic ink composition. The portion may be a part or a plurality of parts of the base material. In some examples, when the substrate has a raised portion as described herein, and the transparent electrostatic ink composition is present on the base material in an area other than that corresponding to the area of the raised portion. In some examples, the substrate has a raised portion and a surrounding flat area, and the transparent electrostatic ink composition is present on base material on at least some of the area corresponding to the area of the flat portion of the substrate, and, in some examples, substantially absent on the base material in the area corresponding to the raised portion of the substrate. In some examples, the substrate has a raised portion and a surrounding flat area, and the transparent electrostatic ink composition is present on at least some of the flat portion of the substrate, and, in some examples, substantially absent on the raised portion of the substrate. In some examples, the transparent electrostatic ink composition is only present between the base material and the substrate in the area of areas of contact. In some examples, the transparent electrostatic ink composition may be printed onto the substrate before formation of the raised portion, and the transparent electrostatic ink composition may be present on an area other than that which forms part of the raised portion.

Before formation of the laminate and adhesion of the base material to the substrate, the transparent electrostatic ink composition may be printed on the base material or a substrate. In some examples, the base material comprises a first polymeric film and the substrate comprises a second polymeric film. In some examples, the base material and/or the substrate is/are substantially flat in form. In some examples, at least one of the base material and the substrate is transparent. In some examples, both the base material and the substrate are transparent. In some examples, at least one of the base material and the substrate comprises a film of biaxially oriented polypropylene or poly(ethylene) terephthalate. In some examples, one of the base material and the substrate comprises a film of biaxially oriented polypropylene or poly(ethylene) terephthalate and the other of the base material and substrate comprises polyethylene.

The base material may be any suitable medium. The base material may be any suitable medium capable of having an image printed thereon. The base material may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the print medium includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The base material is, in some examples, a cellulosic print medium such as paper. The cellulosic print medium is, in some examples, a coated cellulosic print medium. In some examples, a primer may be coated onto the print medium, before the transparent electrostatic ink composition or image layer is printed onto the base material.

In some examples, the base material comprises a film or sheet of at least one of paper, metallic foil, and plastic. In some examples, the base material is transparent. In some examples, the base material comprises a metallized paper or a metallized plastic film. In some examples, the base material comprises an aluminium foil. In some examples the base material comprises a film of a plastic material, for example, polyethylene (PE), linear low density polyethylene (LLDPE), low density polyethylene (LDPE), polypropylene (PP), biaxially oriented polypropylene (BOPP). In some examples, the base material comprises a metallized paper in the form of a paper substrate coated on one surface with a layer of metal, for example aluminium. In some examples, the base material comprises a metallized plastic film in the form of a polymer substrate coated on one surface with a layer of metal, for example aluminium. In some examples, the base material comprises a metallized plastic film in the form of a metallized BOPP film, a metallized PET film, or a metallized polyethylene (PE) film.

In some examples, the base material comprises a film of material, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of material is about 12 µm in thickness.

In some examples, the base material comprises a film of material, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In some examples, the film of material is about 100 µm in thickness.

The transparent electrostatic ink composition adheres the base material to a substrate. The substrate may be any suitable material. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print medium such as paper. The cellulosic print medium is, in some examples, a coated cellulosic print. In some examples, a primer may be coated onto the print medium, before the transparent electrostatic ink composition is printed onto the substrate.

In some examples, the substrate comprises a film or sheet of at least one of paper, metallic foil, and plastic. In some examples, the substrate comprises a metallized paper or a metallized plastic film. In some examples, the substrate comprises an aluminium foil. In some examples the substrate comprises a film of a plastic material, for example, polyethylene (PE), linear low density polyethylene (LLDPE), low density polyethylene (LDPE), polypropylene (PP), biaxially oriented polypropylene (BOPP). In some examples, the substrate comprises a metallized paper in the form of a paper substrate coated on one surface with a layer of metal, for example aluminium. In some examples, the substrate comprises a metallized plastic film in the form of a polymer substrate coated on one surface with a layer of metal, for example aluminium. In some examples, the substrate comprises a metallized plastic film in the form of a metallized BOPP film, a metallized PET film, or a metallized polyethylene (PE) film.

In some examples, the substrate comprises a film of material, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of material is about 12 µm in thickness.

In some examples, the substrate comprises a film of material, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In some examples, the film of material is about 100 µm in thickness.

In some examples, the substrate comprises a film of a polymer, for example a thermoplastic polymer. In some examples, the substrate comprises a film of biaxially oriented polypropylene (BOPP), or polyethylene terephthalate (PET). Other suitable polymers will be known in the art and the examples provided above should be seen as non-limiting examples only.

In some examples the substrate and/or the base material comprises a clear plastic, which may comprise a polymer as described herein, e.g. a polymer selected from polyvinyl chloride (PVC), polyethylene terephthalate (PET), polystyrene (PS), a polycarbonate (PC), acrylonitrile butadiene styrene (ABS), polypropylene (PP) (e.g. BOPP) and acrylic (PMMA), which may be in the form of a sheet or film, which may have a raised portion, as described herein.

In some examples, the substrate comprises a film of a polymer, wherein the film is less than 100 µm in thickness, for example less than 90 µm in thickness, less than 80 µm in thickness, less than 70 µm in thickness, less than 60 µm in thickness, less than 50 µm in thickness, less than 40 µm in thickness, less than 30 µm in thickness, less than 20 µm in thickness, less than 15 µm in thickness. In some examples, the film of polymer is about 12 µm in thickness.

In some examples, the substrate comprises a film of a polymer, wherein the film is greater than 12 µm in thickness, for example greater than 15 µm in thickness, greater than 20 µm in thickness, greater than 30 µm in thickness, greater than 40 µm in thickness, greater than 50 µm in thickness, greater than 60 µm in thickness, greater than 70 µm in thickness, greater than 80 µm in thickness, greater than 90 µm in thickness. In some examples, the film of polymer is about 100 µm in thickness.

In some examples, at least one of the base material and the substrate has a raised portion for accepting or containing an object between the substrate and the base material.

In some examples, at least one of the base material and the substrate comprises a film of biaxially oriented polypropylene or poly(ethylene) terephalate. In some examples, at least one of the base material and the substrate comprises a film of biaxially oriented polypropylene or poly(ethylene) terephthalate and the other of the base material and the substrate comprises card or paper.

In some examples, at least one of the base material or the substrate comprises a metalized coating.

Image Layer

In some examples, at least one of the base material and the substrate has an image layer, and the transparent electrostatic ink composition is printed on the image layer. The image layer may comprise a colorant selected from a black colorant, a magenta colorant, a yellow colorant and cyan colorant.

In some examples, at least one of the base material and the substrate comprises an image or information printed on a first surface of the base material or substrate. In some examples, at least one of the base material and the substrate comprises an image or information electrostatically printed on a first surface of the base material or substrate in an electrostatic printing process.

In some examples, before electrostatically printing the transparent electrostatic ink composition, at least one of the base material and the substrate is electrostatically printed with an electrostatic ink composition comprising a colorant, a thermoplastic resin, and a charge adjuvant and/or a charge director to form an image layer. The thermoplastic resin, the charge adjuvant and/or the charge director of the electrostatic ink composition used to form the image layer may, each, independently, be the same as or different from the thermoplastic resin, the charge adjuvant and/or the charge director of the transparent electrostatic ink composition, and may be selected from the thermoplastic resin, the charge adjuvant and/or the charge director disclosed above in respect of the transparent electrostatic ink composition. The colorant of the electrostatic ink composition may be selected from a black colorant, a magenta colorant, a cyan colorant and a yellow colorant.

In some examples, at least one of the base material and the substrate comprises an image layer. In some examples, at least one of the base material and the substrate comprises an image layer and/or information printed on a first surface of the base material or substrate in an electrostatic printing process using an electrostatic ink composition comprising a colorant, a thermoplastic resin and a charge director and/or a charge adjuvant. The image or information may be reverse printed onto the first surface of the base material or substrate. A second surface of the base material or substrate causes the image or information to appear the right way round when viewed. In this way, the image or information is embedded within the multi-layer structure of the laminate and not on the outermost surface, and thus protected from damage.

In some examples, the base material, which may comprise a plastic film, is subjected to a Corona treatment r prior to printing the transparent electrostatic ink composition and/or the electrostatic ink composition comprising a colorant that forms an image layer, which may also improve bond strength. In some examples, at least one of the base material and substrate is subjected to a Corona treatment to improve bond strength.

Primer Layer

In some examples, at least one of the base material and the substrate comprises a primer layer, which may be disposed on a polymeric film, as described herein. In some examples, the transparent electrostatic ink composition is printed onto a primed base material, i.e. a base material having a primer layer. In some examples, the substrate is a primed substrate, i.e. a substrate having a primer layer. A primer layer is a layer which comprises a print-receptive surface. In some examples the primer layer comprises an ethylene copolymer, for example Michelman DigiPrime® 050.

In some examples, at least one of the base material and the substrate has a primer on a surface onto which the transparent electrostatic ink composition or the electrostatic ink composition that forms the image layer is printed. In some examples, the base material comprises a precursor base material (e.g. a polymeric film layer) that has a first surface on which a primer is disposed, the image layer and/or the transparent electrostatic ink composition may then disposed on the primer disposed on the surface of the base material.

In some examples, the primer comprises a primer resin. In some examples, the primer resin may be selected from the group comprising or consisting of hydroxyl containing resins, carboxylic group containing resins, and amine based polymer formulations. In some examples a hydroxyl containing resin may be selected from polyvinyl alcohol resins, e.g. polyvinyl alcohol based as polyvinyl butyral formulation (Butvar, Eastman), Vinnol® (Wacker polymers), cellulose derivative additives (Eastman), polyester (Dynapol, Evonic) and polyurethane based formulation with hydroxyl groups. In some examples, the carboxylic group containing resins may be selected from: olefin co-acrylic or methacrylic acid based copolymers, polyacrylic acid based polymers, polylactic acid based polymers. In some examples, the amine based polymer formulations may be selected from polyamines, polyethylene imines. The primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, polyacrylic polymers. An example of a material suitable as a primer is DP030 (available from Michelman, Inc.).

In some examples, the primer resin comprises a carboxylic functional group, an amine functional group or a polyol functional group. In some examples, the primer resin comprises an amine functional group or a carboxylic functional group.

In some examples, the primer resin comprises an amine functional group. In some examples, the primer resin comprises or consists of a polyethylene imine resin. An example of a material suitable as a primer is DP050 (available from Michelman, Inc.).

In some examples, the primer comprises a cross-linked primer resin.

In some examples, the base material comprises a precursor base material (e.g. a polymeric film) having a first surface that has a primer thereon and the transparent electrostatic ink composition is printed onto the primer on the first surface of the first flexible substrate.

In some examples, the base material comprises a precursor base material (e.g. a polymeric film) having a first surface that has a primer on the first surface and an image layer, is printed, in some examples electrostatically printed, onto the primer on the first surface of the precursor base material to form the base material, and the transparent electrostatic ink composition is electrostatically printed on the image layer.

Multiple Layers

In some examples, two or more layers of the transparent electrostatic ink composition are printed onto the base material, resulting in higher bonding strength than with one printed layer. In some examples, two or more layers of the transparent electrostatic ink composition may be printed on top of an image layer in the base material.

Electrostatic Printing

The method may involve electrostatically printing a transparent electrostatic ink composition onto the base material or substrate, wherein the transparent electrostatic ink composition comprises a thermoplastic resin, and a charge adjuvant and/or a charge director. The base material, transparent electrostatic ink composition, the thermoplastic resin, and the charge adjuvant and/or the charge director may be as described herein.

The electrostatic printing may comprise
forming a latent electrostatic image on a surface;

contacting the surface with the transparent electrostatic ink composition, such that at least some of the transparent electrostatic ink composition adheres to the surface to form a developed toner image on the surface, and transferring the toner image to a base material or substrate as described herein. When printing an image layer, the electrostatic process is similar except that the transparent electrostatic ink composition is replaced with an electrostatic ink composition comprising a colorant.

The surface on which the latent electrostatic image is formed may be on a rotating member, e.g. in the form of a cylinder. The surface on which the latent electrostatic image is formed may form part of a photo imaging plate (PIP). The contacting may involve passing the electrostatic composition between a stationary electrode and a rotating member, which may be a member having the surface having a latent electrostatic image thereon or a member in contact with the surface having a latent electrostatic image thereon. A voltage is applied between the stationary electrode and the rotating member, such that the particles adhere to the surface of the rotating member. This may involve subjecting the electrostatic ink composition to an electric field having a field gradient of 50-400V/μm, or more, in some examples 600-900V/μm, or more.

The intermediate transfer member may be a rotating flexible member, which is in some examples heated, e.g. to a temperature of from 80 to 160° C., in some examples from 90 to 130° C., in some examples from 100 to 110° C.

The method may involve printing the transparent electrostatic ink composition onto an image layer, as described herein. The image layer described herein may involve electrostatically printing the image, which may be printed on the same apparatus as the transparent electrostatic ink composition.

Blister Pack

In one aspect, there is disclosed a blister pack, comprising:
a base material;
a substrate adhered to a portion of the base material by an electrostatic ink composition comprising a thermoplastic resin, and a charge adjuvant and/or a charge director, at least one of the base material and the substrate having a raised portion for accepting or containing an object between the substrate and the base material.

In the blister pack, the raised portion may form a cavity between base and the substrate. The cavity may be contain an object, e.g. a consumer item. In some examples, one of the substrate and the base material is in the form of a flat sheet and the other of the substrate and the base material has the raised portion for accepting or containing an object between the substrate and the base material. The raised portion in the base, for example, indicates a portion that projects above at least some of the rest of the base.

The base material and the substrate may be as described above. In some examples, the base material comprises a material selected from a cellulosic material and a plastic material and, in some examples, is in the form of a flat sheet, and the substrate comprises a plastic material, and has a raised portion for accepting or containing an object between the substrate and the base material.

In some examples, the base material comprises a material selected from a cellulosic material and a metallized plastic material and, in some examples, is in the form of a flat sheet, and the substrate comprises a clear plastic material, and has a raised portion for accepting or containing an object between the substrate and the base material.

In some examples, the base material comprises a material selected from a cellulosic material and a first plastic material, e.g. a metallized plastic material, and, in some examples, is in the form of a flat sheet, and the substrate comprises a second plastic material, and has a raised portion for accepting or containing an object between the substrate and the base material, and an image layer, in some examples an electrostatically printed image layer, is disposed between the transparent electrostatic ink composition and either the substrate or the base material.

The cellulosic material of the base material may comprise paper or card. The mass of the cellulosic material, e.g. paper or card, may, for examples, be at least 100 gsm, in some examples at least 150 gsm, in some examples at least 200 gsm, in some examples at least 250 gsm, in some examples at least 300 gsm. In some examples, the base material comprises a metallized paper or a metallized plastic film. In some examples, the base material comprises an aluminium foil. In some examples the base material comprises a film of a plastic material, for example, polyethylene (PE), linear low density polyethylene (LLDPE), low density polyethylene (LDPE), polypropylene (PP), biaxially oriented polypropylene (BOPP). In some examples, the base material comprises a metallized paper in the form of a paper substrate coated on one surface with a layer of metal, for example aluminium. In some examples, the base material comprises a metallized plastic film in the form of a polymer substrate coated on one surface with a layer of metal, for example aluminium. In some examples, the base material comprises a metallized plastic film in the form of a metallized BOPP film, a metallized PET film, or a metallized polyethylene (PE) film.

In some examples, the substrate has the raised portion and comprises a plastic selected from polyvinyl chloride (PVC), polyethylene terephthalate (PET), polystyrene (PS), a polycarbonate (PC), acrylonitrile butadiene styrene (ABS), polypropylene (PP) and acrylic (PMMA). The substrate may have a plurality of raised portions.

The raised portion of the substrate may be formed by thermoforming or vacuum forming the substrate.

The raised portion may be shaped to approximately correspond to the shape of the object that may be accepted between or contained between the substrate and the base material. In some examples, the raised portion is semi-ovoid. In some examples at least one of the base material and the substrate has a two or more raised portions. In some examples at least one of the base material and the substrate has a two or more semi-ovoid raised portions.

In some examples, the object is a medicament. In some examples the object is a foodstuff.

Adhering the Base Material and Substrate Together

In some examples, the method may involve contacting the substrate with the transparent electrostatic ink composition on the base material to adhere the base material to the substrate. In some examples, the method may involve contacting the base material with the transparent electrostatic ink composition on the substrate to adhere the base material to the base material.

The method may involve contacting the substrate with the transparent electrostatic ink composition on the base material, or contacting the base material with the transparent electrostatic ink composition on the substrate, while the thermoplastic resin is softened or molten, and then allowing the thermoplastic resin to harden, so that the electrostatic ink composition adheres the base material and the substrate together.

The contacting may be carried out at a suitable temperature to allow the thermoplastic resin to soften or become molten during the contacting. The suitable temperature may be a raised temperature, e.g. of 30° C. or above, in some examples 40° C. or above, in some examples 50° C. or above, in some examples 60° C. or above, 70° C. or above, 80° C. or above, in some examples 100° C. or above, in some examples 150° C. or above, in some examples 180° C. or above. The suitable temperature may be from 30° C. to 100° C., in some examples, in some examples 30° C. to 80° C. in some examples 30° C. to 70° C., in some examples 40° C. to 80° C. The suitable temperature may be from 50° C. to 250° C., in some examples from 60° C. to 220° C., in some examples from 90° C. to 210° C., in some examples from 90 to 130° C., in some examples from 100 to 110° C. After the contacting, if the thermoplastic rein has softened or become molten during the contacting, the thermoplastic resin may be allowed to cool and harden, to adhere the base material and the substrate together. The contacting may involve pressing the base material and the substrate between two members, at least one of which, in some examples both of which, is/are heated, e.g. to a temperature mentioned above. In some examples, the two members may be heated to different temperatures, e.g. one at a temperature of from 50° C. to 100° C., e.g. 70° C. to 90° C., and the other at a higher temperature, e.g. a temperature of 150° C. or more, e.g. a temperature of from 150° C. to 250° C., e.g. a temperature of from 180° C. to 220° C. The contacting may be carried out on a lamination apparatus or a pressure sealer, which are commercially available.

Pressure may be applied to the base material and the substrate during the contacting, e.g. at the temperatures mentioned above, to improve adhesion. The pressure may be a pressure of at least from 1 bar (100 kPa), in some examples at least 2 bar, in some examples from 1 bar to 20 bar, in some examples 2 bar to 10 bar, in some examples 2 bar to 5 bar, in some examples 5 bar to 10 bar.

The contacting under a raised temperature and, optionally under pressure, may be carried out for a suitable time period to effect adhesion, and the suitable time may be selected at least 0.1 seconds, in some examples at least 0.2 seconds, in some examples at least 0.5 seconds, in some examples at least 0.8 seconds, in some examples at least 1 second, in some examples at least 1.2 seconds, in some examples at least 1.5 seconds, in some examples at least 1.8 seconds, in some examples at least 2 seconds. The suitable time may be from 0.1 seconds to 10 seconds, in some examples 0.5 seconds to 5 seconds.

EXAMPLES

The following illustrates examples of the methods and other aspects described herein. Thus, these Examples should not be considered as limitations of the present disclosure, but are merely in place to teach how to make examples of the present disclosure.

In the following examples, 'Isopar' is Isopar™ L Fluid, produced by ExxonMobil and having CAS Number 64742-48-9.

In the following examples, the resin used is Nucrel 699, available from DuPont, and A-C 5120, available from Honeywell, in a weight ratio of 4:1.

In the following examples, NCD indicates a natural charge director made of three components: KT (natural soya lecithin in phospholipids and fatty acids), BBP (basic barium petronate i.e. a barium sulfonate salt of a 21-26 hydrocarbon alkyl, supplied by Chemtura), and GT (dodecyl benzene sulfonic acid isopropyl amine, supplied by Croda). The composition being 6.6 wt % KT, 9.8 wt % BBP and 3.6 wt % GT, balance 80% Isopar.

In the following examples, SCD indicates a synthetic charge director, being a barium bis sulfosuccinate salt as described in US 2009/0311614 or WO2007130069. This is a strong negative charge director with strong base in the micelle core (barium phosphate) which enhances stable negative charge on ink particle. SCD is a charge director and in the absence of a dispersant) has been found to display very low field charging (high charge partitioning).

In the following examples, the conditions for sealing the blister pack in a semi-automatic sealer were: top jaw 200° C., bottom jaw: 85° C., dwell time: 2 sec, pressure: 600N.

In the following examples, Lamination Bond Strength (LBS) was measured with an Instron 210 Family Electromechanical Universal Testing Machine. The lamination bond strength is tested by applying Test Method for Comparison of Bond Strength or Ply Adhesion of Similar Laminates Made from Flexible Materials (ASTM F0904-98R08).

TABLE 1

| Example # | Blister Pack Thermoformed Substrate | Blister card (flat base material) | Digital adhesive formulation (transparent electrostatic ink composition) |
| --- | --- | --- | --- |
| 1 | PET slide (optimized) 125 μm | Paper + ink + digital adhesive | HP Transparent Indigo 4.5 |
| 2 | PVC/PE (PVC/PET/TERMOFORM Pe Lamination Film, Polyfilm) | Paper + ink + digital adhesive | HP Transparent indigo 4.5 paste + 70% Fusabond560 |
| 3 | PET slide (optimized) 125 μm + ink + digital adhesive | Carton | HP Transparent Indigo 4.5 |
| 4 | PET slide (optimized) 125 μm + ink + digital adhesive | PE/Al Global AI7/90PE, 100 μm | HP Transparent Indigo 4.5 |

Four different constructions of blister pack according to Table 1 were prepared using digital adhesive:

Example 1

Commercially available Transparent 4.5 Indigo ink (a transparent electrostatic ink composition available from HP Indigo) was used as digital adhesive for blister pack preparation. HP Indigo 4.5 Transparent Electroink is an electrostatic printing composition comprising particles of the resins Nucrel 699 (DuPont) and A-C 5120 (Honeywell) in the ratio of 4:1 (wt:wt) that encapsulate a charge adjuvant (aluminium stearate), suspended in Isopar, and containing a charge director (NCD, as mentioned above—although SCD could also be used).

The layer was printed as above, the transparent electrostatic ink image pattern printed selectively on paper in the sealing areas, i.e. the points at which the paper will contact the flat portions of the thermoformed substrate. Printing was performed on Indigo 7600 press. Substrate Condat 300 g was used for printing. The image was cut off and sealed with forming pack prepared from PET optimized (125 μm). The adhesive layer was attached to primed side of PET while sealing. Sealing was performed in the Semi-automatic Sealer. The conditions in the sealer were: top jaw: 200° C., bottom jaw: 85° C., dwell time: 2 seconds, dwell pressure: 600 N.

Figure 1B:
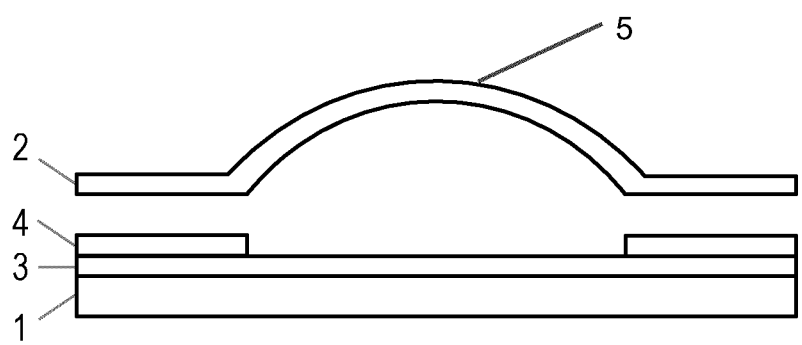
Figure 1C:
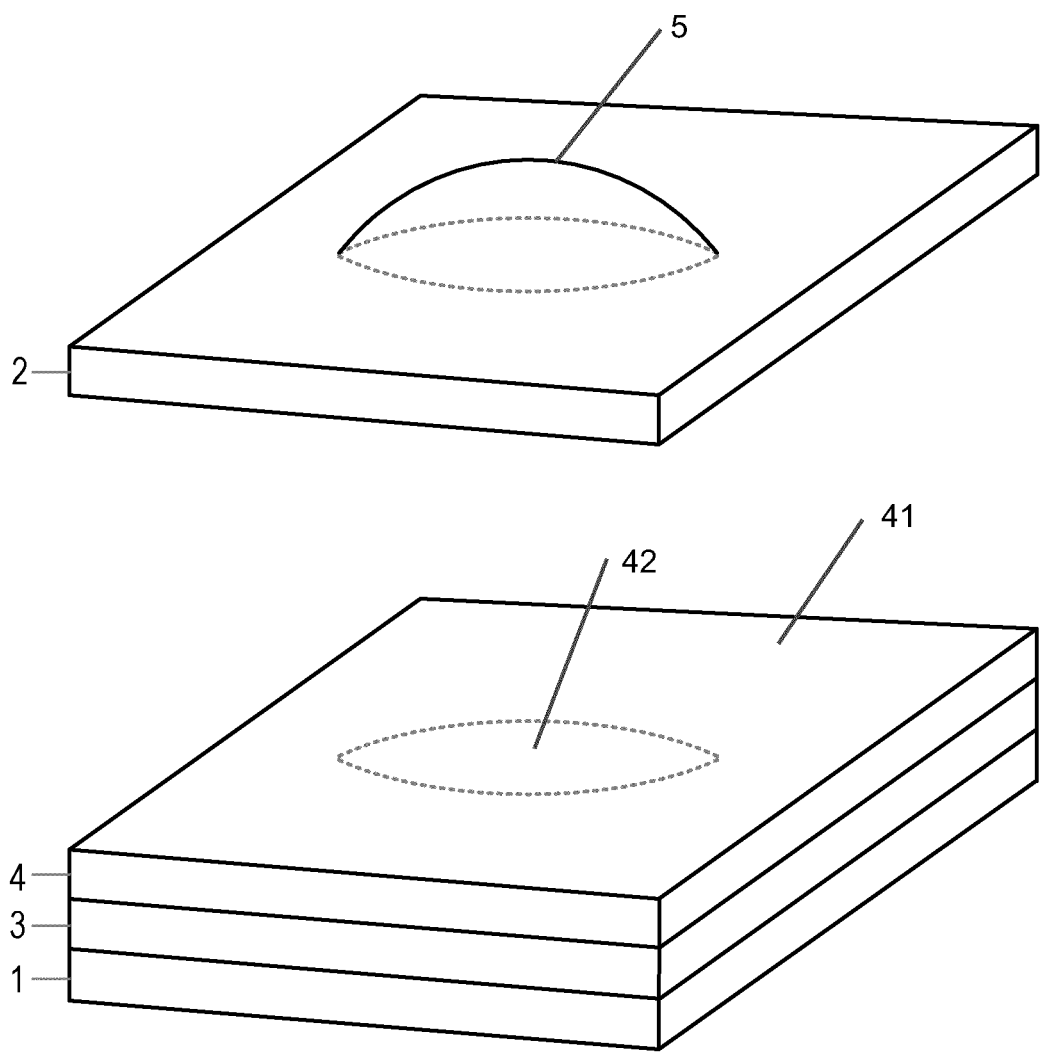

The blister pack and its formation is shown schematically in FIGS. 1A, 1B and 1C. FIGS. 1A and 1B show a cross-sectional view through the layers. In these figures, the base material (1) is the flat blister card, layer (3) is an electrostatically printed image layer, layer (4) is the layer of transparent electrostatic ink, selectively printed in the areas that will contact the flat portions of substrate (2) having the raised portion (5). FIG. 1B shows the base material (1) and the substrate before they are adhered together; the base material has been electrostatically printed first with the image layer (3) and then with transparent electrostatic ink composition (4), and, FIG. 1C shows a three-dimensional view of the components of FIG. 1B. It can be seen that the electrostatic ink composition has been printed selectively in area (41), such that this contacts the flat portion of substrate (2); no electrostatic ink composition has been printed in area (42), corresponding to the raised portion of the substrate. FIG. 1A shows the blister pack after adhesion of the base material to the substrate.

Example 2

A digital thermal adhesive formulation was prepared by the following procedure: 32 g of LEP Indigo 4.5 paste (35 wt % solids in Isopar, the solids being the resins Nucrel 699 (DuPont) and A-C 5120 (Honeywell) in the ratio of 4:1 (wt:wt)) was mixed with 80 g of Fusabond560D (Du Pont) paste (35% solids in Isopar), 0.6 g of aluminum stearate (Sigma-Aldridge) and 86.83 g of Isopar were ground for 24 hours at 25° C. using a laboratory 01HD attritor from Union Process (USA). After the grinding, the mixture was diluted with isopar to obtain 2% dispersion and charged by adding. The ink was diluted to 2 wt % solids in Isopar, charged by adding 8 ml of commercially available HP Indigo Imaging Agent (for use with HP Indigo 6000 series presses; Imaging Agent contains NCD, but SCD could be used) left to stand for 20 h for charge to develop.

Printing was performed in Indigo 7600 press. The layer of digital adhesive LEP ink was printed on paper as a separation above an liquid electrostatically printed image selectively in the sealing areas, i.e. the points at which the paper will contact the flat portions of the thermoformed substrate. The paper Condat 300 g was used for printing. The image was cut off and sealed with forming pack prepared from PVC/PE sheet (Polyfilm, 400 μPVC, 60 μPE, PVC/PET/ TERMOFORM Pe Lamination Film). The adhesive layer was contact with PE side of PVC/PE while sealing. Sealing was performed in the Semi-automatic Sealer. The conditions in the sealer were: top jaw: 200° C., bottom jaw: 85° C., dwell time: 2 seconds, dwell pressure: 600 N.

This blister pack and its formation is again shown schematically in FIGS. 1A, 1B and 1C, which are described above.

Example 3

Commercially available Transparent HP Indigo 4.5 Electroink was used as a digital adhesive for blister pack preparation. In this Example, the layer of Transparent HP Indigo 4.5 Electroink was printed as separation on thermoformed plastic above an liquid electrostatically printed image in the sealing areas, i.e. the flat portions of the thermoformed plastic that will contact the flat paper substrate. The thermoformed substrate was PET optimized (125 μm). The image was cut off and forming pack was prepared from it. Then it was sealed with carton (paperboard—solid bleached sulphate (SBS) 300 μm). The adhesive layer was contact with the carton while sealing. Sealing was performed in the Semi-automatic Sealer. The conditions in the sealer were: top jaw: 200° C., bottom jaw: 85° C., dwell time: 2 seconds, dwell pressure: 600 N.

Figure 2A:
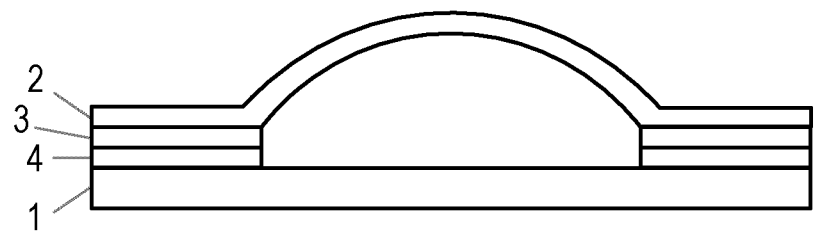
FIGS. 2A and 2B show schematically an example of a further laminate, in the form of a blister pack and its formation.
Figure 2B:
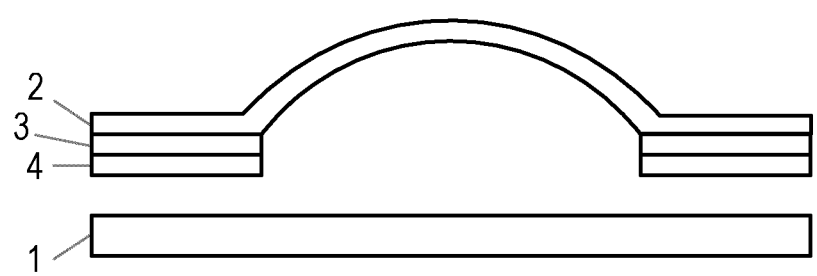

The blister pack and its formation is shown schematically in FIGS. 2A and 2B. In these figures, the base material (1) is the flat blister card, layer (3) is an electrostatically printed image layer, layer (4) is the layer of transparent electrostatic ink, selectively printed on the flat portions of substrate (2) having a raised portion (5).

Example 4

Commercially available Transparent HP Indigo 4.5 Electroink was used as a digital adhesive for blister preparation. The layer was printed as separation on thermoformed plastic above a liquid electrostatically printed image selectively in the sealing areas. The thermoformed substrate was PET optimized (125 μm). The image was cut off and forming pack was prepared from it. A metallized plastic sheet of aluminium on polyethylene (an Al/PE sheet; fromGlobal Al7/90PE, 100 μm) was used as blister card. The adhesive layer was attached to the PE side of Al/PE while sealing. The conditions in the sealer were: top jaw: 200° C., bottom jaw: 85° C., dwell time: 2 seconds, dwell pressure: 600 N.

The blister pack and its formation is shown schematically in FIGS. 2A and 2B. In these figures, the base material (1) is the flat blister card (the Al/PE sheet), layer (3) is an electrostatically printed image layer, layer (4) is the layer of transparent electrostatic ink, selectively printed on the flat portions of thermoformed substrate (2). FIG. 2B shows the base material (1) and the substrate before they are adhered together; the flat portion of the substrate having been electrostatically printed first with the image layer (3) and then with transparent electrostatic ink composition (4). FIG. 2A shows the blister pack after adhesion of the base material to the substrate.

In Examples 1 and 2 the digital adhesive (the transparent electrostatic ink composition) was printed as a layer on the top of the ink printed on paper board selectively at the sealing area (FIGS. 1A and 1B)). Blisters in Examples 1, 2 were produced by heat sealing of paper board having the digital adhesive layer to coating layer which is primed surface on PET optimized form (Example 1) and to PE coating layer on PVC form (Example 2, FIG. 1). Two different formulations were used in preparation of digital LEP adhesive: Transparent Indigo standard formulation (Example 1) and the formulation based on additional hot melt resin Fusabond 560 (DuPont) (Example 2).

In Examples 3 and 4, the digital adhesive layer was printed as a layer above the ink printed on PET125 μm optimized sheet selectively at the sealing area (FIG. 2). Blister pack form was produced from this sheet. Blisters in Examples 3, 4 were produced by heat sealing of carton board (example 3, picture 2) or PE side of AUPE substrate (Example 4) to printed adhesive layer on blister form. Transparent Indigo standard formulation was used for preparation of a digital heat sealer layer.

Comparison between strength of adhesion in a construction having digital adhesive layer above the LEP ink and the same construction without digital heat seal layer was performed.

The lamination bond strength (LBS) for the construction in Example 4 was measured and compared to LBS of the same construction without Digital adhesive layer. It was found that the LBS in Example 4 was 11 N/inch, however the LBS for the same construction without a digital adhesive layer above the printed LEP ink was 6 N/inch. It proves the fact that digital adhesive enhances the adhesion strength of the blister construction.

In the present disclosure, the inventors have discovered that a transparent electrostatic ink composition can be printed selectively on one of the layers to allow the layer to be adhered together. The transparent electrostatic ink composition acts as an adhesive, reducing production costs and curing times. In some examples, this transparent electrostatic ink composition can be applied over a printed image, e.g. an electrostatically printed image, before adhesion. This allows the efficient production of laminates. Other techniques of applying adhesive may require long cure times, and, may not be able to be applied in the same apparatus as the image layer.

Digital electrostatic printing also allows the selective application of the adhesive layer.

While the laminate, the method, and related aspects have been described with reference to certain examples, those skilled in the art will appreciate that various modifications, changes, omissions, and substitutions can be made without departing from the spirit of the disclosure. It is intended, therefore, that the laminate and related aspects be limited by the scope of the following claims. The features of any dependent claim can be combined with the features of any of the other dependent claims, and any independent claim.

The invention claimed is:

1. A laminate, comprising:
   a base material;
   a transparent electrostatic ink composition selectively disposed on a portion of the base material, the transparent electrostatic ink composition comprising a thermoplastic resin, and a charge adjuvant and/or a charge director;
   a substrate adhered to the base material at the portion of the base material by the transparent electrostatic ink composition.

2. The laminate according to claim 1, wherein an image layer is disposed between the transparent electrostatic ink composition and either the substrate or the base material, and at least one of the substrate and the base material comprises a clear plastic.

3. The laminate according to claim 2, wherein the image layer comprises an electrostatic ink composition comprising a colorant, a thermoplastic resin, and a charge adjuvant and/or a charge director.

4. The laminate according to claim 1, wherein the thermoplastic resin comprises a polymer selected from an ethylene acrylic acid co-polymer and an ethylene methacrylic acid co-polymer.

5. The laminate according to claim 1, wherein the laminate is a blister pack, such that at least one of the base material and the substrate has a raised portion for accepting or containing an object between the substrate and the base material.

6. The laminate according to claim 1, wherein the transparent electrostatic ink composition further comprises a solid polar compound selected from the group consisting of a saccharide, polyacrylic acid, polyvinyl alcohol, styrene maleic anhydride, a bismaleimide oligomer, a cellulose derivative and an aliphatic urethane acrylate.

7. The laminate according to claim 1, wherein at least one of the base material and the substrate comprises a plastic selected from polyvinyl chloride, polyethylene terephthalate, polystyrene, a polycarbonate, acrylonitrile butadiene styrene, polypropylene and acrylic and has a raised portion for accepting or containing an object between the substrate and the base material.

8. A process for preparing a laminate, comprising:
   electrostatically printing a transparent electrostatic ink composition selectively onto a predetermined portion of a base material, wherein the printed electrostatic ink composition comprises a thermoplastic resin, and a charge adjuvant and/or a charge director;
   providing a substrate; and
   contacting the substrate with the transparent electrostatic ink composition on the base material, so that the electrostatic ink composition selectively adheres the base material and the substrate together at the predetermined portion of the base material.

9. The process for preparing a laminate according to claim 8, wherein at least one of the base material and the substrate further comprises an electrostatic ink composition comprising a colorant, a thermoplastic resin, and a charge adjuvant and/or a charge director.

10. The process for preparing a laminate according to claim 8, wherein the laminate is a blister pack, and at least one of the base material and the substrate has a raised portion for accepting or containing an object between the substrate and the base material.

11. The process for preparing a laminate according to claim 8, wherein at least one of the base material and the substrate comprises a plastic selected from polyvinyl chloride, polyethylene terephthalate, polystyrene, a polycarbonate, acrylonitrile butadiene styrene, polypropylene and acrylic and has a raised portion for accepting or containing an object between the substrate and the base material.

12. A process for preparing a laminate according to claim 9, wherein the other of the base material and the substrate is substantially flat and comprises a cellulosic material or a metallized plastic film.

13. The laminate according to claim 1, wherein at least one of the base material and the substrate has a raised portion for accepting or containing an object between the substrate and the base material, thereby forming a blister pack.

14. The laminate according to claim 13, wherein an electrostatically printed image layer is disposed between the transparent electrostatic ink composition and either the substrate or the base material, and at least one of the substrate and the base material comprises a clear plastic.

* * * * *